Figure 1:
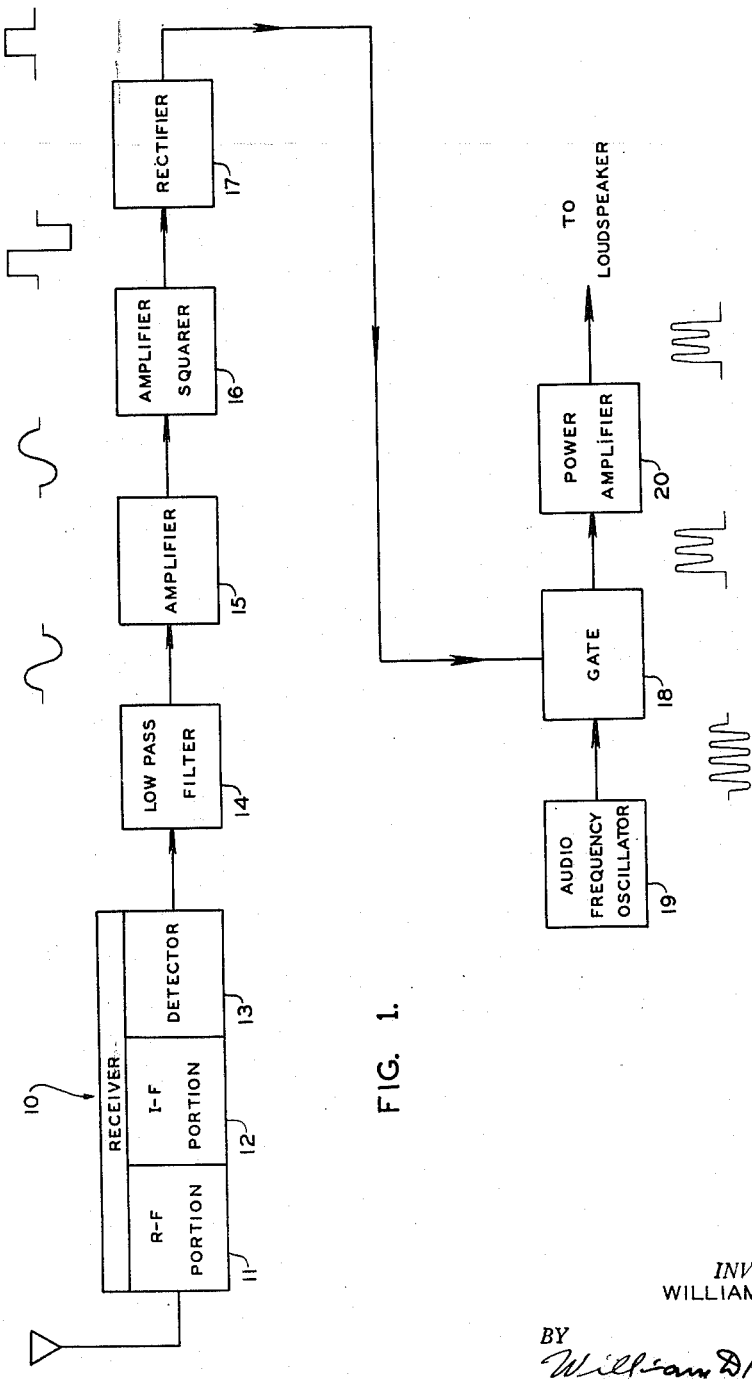

March 20, 1951 W. TUCKER 2,545,503
RADIO OBJECT DETECTION ALARM
Filed May 30, 1945 2 Sheets-Sheet 1

INVENTOR.
WILLIAM TUCKER
BY
William D. Hall.
ATTORNEY.

INVENTOR.
WILLIAM TUCKER.
BY
*William D. Hall.*
ATTORNEY.

Patented Mar. 20, 1951

2,545,503

UNITED STATES PATENT OFFICE 2,545,503

RADIO OBJECT DETECTION ALARM

William Tucker, Newark, N. J., assignor to the United States of America as represented by the Secretary of War Application May 30, 1945, Serial No. 596,713

9 Claims. (Cl. 343—5)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to object-detecting radio systems, and more particularly, to the indicating means utilized in connection therewith for informing the observer when an object has been detected.

My present invention is especially suitable for use with a detecting system employing what is known as a C.-W. "fence," although it is to be clearly understood that this is not intended as a limitation upon the use thereof.

According to this particular system, a radio transmitter is caused to continuously and to directionally emit radio-frequency energy as to establish, in a sector of space intervening said transmitter, and a receiver, located at a convenient distance therefrom, a high, narrow beam of radio energy which constitutes a "fence." Any electrically conducting object, for example, an aircraft, entering the field of energy constituting said "fence," reradiates or reflects a portion of the energy incident thereon; and due to the Doppler effect, the frequency of the reradiated or reflected energy appears to be slightly different from that of the originally transmitted energy, the apparent frequency being a function of the velocity of the object. At a given instant at the receiver, two different frequencies are therefore received, and by mixing the same, a low-frequency beat note is obtained. As the object approaches the center of the "fence," the frequency of the beat note decreases, and at the exact center of the "fence," there is a zero beat if the object is traveling in a path prependicular to the "fence." Obviously, as the object passes the center and enters the opposite side of the "fence," the frequency of the beat note rises again, until the object passes completely out of the sector of space comprising the "fence."

Efforts to utilize this beat note for informing the observer of the detection of the object have heretofore been unsuccessful for lack of an adequate indicator, and it is, therefore, the main object of the present invention to generally improve Doppler-effect object-detecting systems, by providing such an indicator, which is simple in construction, easy and economical to manufacture and assemble, and admirably adapted to the performance of its intended function.

I employ said beat note to control the operation of an electronic gate, and I provide a source of audio-frequency energy, which is adapted, upon passage through the gate, to cause the operation of an aural indicator, such as a loud speaker. By means of this arrangement, as soon as an object enters the "fence," an audible tone is intermittently emitted from the loud speaker, the frequency of the tone being constant but the repetition rate thereof being a function of the varying frequency of the beat note. Inasmuch as the beat frequency gradually reduces to zero, and then increases again to its maximum, the observer, who need not watch the indicator, becomes advised, not only of the instant when the object enters the "fence," but also, of the instant when said object reaches the center of said "fence," and the instant when said object leaves the "fence."

In the accompanying specification there is described, and in the annexed drawings shown, what is at present considered a preferred embodiment of the indicators of the present invention. It is, however, to be clearly understood that the present invention is not limited to said embodiment, inasmuch as changes therein may be made without the exercise of invention and within the true spirit and scope of the claims hereto appended.

Figure 2:
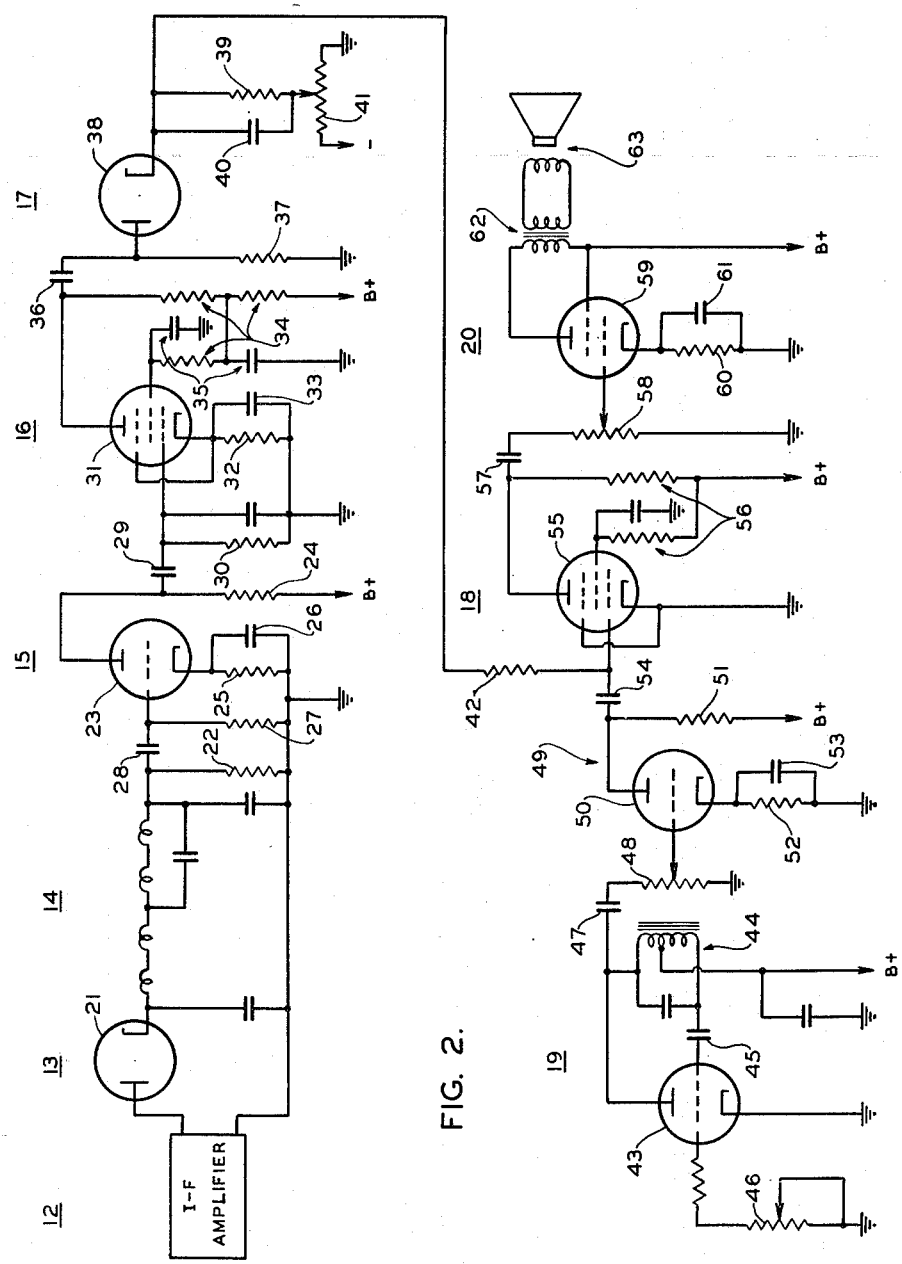

In said drawings,

Figure 1 is a block diagram of the components located at the receiving station of a detecting system employing a C.-W. "fence." together with an indicator assembled in accordance with the principles of the present invention; and Figure 2 is a schematic diagram of one form of circuit which may be used in carrying out the principles of the present invention.

Referring now more in detail to the aforesaid preferred embodiment of the present invention, with particular reference to Figure 1 of the drawings, the numeral 10 generally designates a conventional superheterodyne receiver, which includes a radio-frequency (R.-F.) portion 11, an intermediate frequency (I.-F.) portion 12, and a detector 13.

This receiver is intended to be located at some convenient distance, say 50 miles, from an ultra-high frequency radio transmitter (not shown). The continuous wave (C.-W.) radiation from this transmitter is directed toward the receiver through the use of an appropriate directional antenna array, properly oriented, whereby there is established, between the transmitter and the receiver, a high, narrow "fence" of the radiated energy.

As above stated, upon a conducting object, such as an aircraft, entering the "fence" thus established, a portion of the R.-F. energy encountered by the object is reflected or reradiated, the frequency of the reflected or reradiated energy appearing, however, to be slightly different from that originally transmitted. This, as is well known, is due to the Doppler effect, the apparent frequency of the reflected or reradiated energy depending, of course, upon the velocity of the reflecting or reradiating object.

The receiver, therefore, simultaneously picks up two signals, one, originally emitted by the distant transmitter, of a fixed frequency, and a second, caused by the reflecting or reradiating object, of a varying apparent frequency. These two signals are mixed in the receiver and the combination results in a beat note, the frequency of which is preferably, but not necessarily, in the low-audio range, and is equal to the numerical difference between the frequencies of the two received signals.

The frequency of the beat note will be a maximum twice, immediately upon the object entering the "fence," and just as the object passes out of the "fence." As the object approaches the center of the "fence," the path length of the reflected or reradiated energy approaches that of the originally transmitted energy, and at the exact center these paths coincide. Therefore, at the center of the "fence" the beat frequency becomes zero.

The output of the receiver 10 is passed through a low-pass filter 14, designed to pass only the frequencies of the beat signals. These signals are amplified, as at 15, distorted, as at 16, to obtain a square wave, and rectified, as at 17, to obtain a positive-going square wave of a frequency equal to that of the beat note.

The rectified wave thus obtained is utilized to control the operation of an electronic gate 18, to which there is also fed audio-frequency energy, generated by an oscillator 19. The output of the gate is applied to a power amplifier 20, and the output of the latter is employed to operate an aural indicator, such as a loud speaker.

The approximate wave shapes resulting from the major components above referred to are shown immediately to the right of each such component. From these it will be seen that the frequency of the audio oscillator 19 is preferably higher than the highest beat frequency adapted to be received by gate 18 from rectifier 17.

Reference is now made to the circuit diagram shown in Figure 2 of the drawings.

The output of the I.-F. amplifier 12 of the receiver 10 is fed, preferably, to a diode detector 21 the cathode circuit of which includes the filter 14. The latter may consist of series inductors and shunt capacitors, as shown, of appropriate values to pass only the low frequencies of the beat notes resulting from mixing the received radio frequencies, and only said low frequencies appear across the load resistor 22 of said detector.

The amplifier 15, which is receptive of the voltages appearing across said resistor 22, may include a triode-vacuum tube 23, plate voltage to which is supplied through a load resistor 24, and the cathode of which is grounded through a biasing resistor 25, by-passed by a capacitor 26. The input circuit of said tube includes a grid resistor 27 and coupling capacitor 28.

The plate output of the tube 23 is fed to the amplifier-squarer 16 through a coupling capacitor 29 and a grid resistor 30. The amplifier-squarer may include a pentode-vacuum tube 31 the cathode of which is grounded through a bias resistor 32, by-passed by a capacitor 33.

Plate and screen-grid voltage to said tube is supplied through a voltage dropping and decoupling-resistance network 34 of such value as to permit the sine-wave input to the tube to drive the same alternately to saturation and cutoff whereby a square-wave output is obtained. The network 34 includes appropriate by-pass capacitors 35. The suppressor grid of the tube is conventionally tied to the cathode thereof.

The plate output of the tube 31 is applied across a series connected capacitor 36 and resistor 37, and the voltage across the latter is applied to the rectifier 17. The rectifier may consist of a diode-vacuum tube 38, the cathode circuit of which includes a load resistor 39 shunted by a capacitor 40, the conduction of the tube being controlled by connecting the cathode thereof to the adjustable arm of a potentiometer 41 connected between ground and some point which is appropriately negative with respect thereto. The positive-going square-wave output of the rectifier is applied, through a current-limiting resistor 42, to the electronic gate or mixer 18.

The audio-frequency oscillator 19 may consist of a triode-vacuum tube 43 the cathode of which is grounded, and the plate-to-grid circuit of which includes a circuit 44 comprising a center-tapped choke and shunt capacitor to provide the necessary phase shift to sustain oscillation. Plate voltage to the tube 43 is supplied through the circuit 44, and feedback from the plate to the grid is obtained through a coupling capacitor 45. The input circuit of the tube 43 includes a potentiometer 46 which functions as a frequency control.

The audio-frequency oscillations generated by the oscillator 19 are applied through a coupling capacitor 47 and amplitude control 48 to an audio-frequency amplifier 49. The latter may consist of a triode-vacuum tube 50 plate voltage to which is supplied through a resistor 51 and the cathode of which is grounded through a biasing resistor 52, shunted by a capacitor 53.

The amplified audio-frequency oscillations from the amplifier 49 are fed, through a coupling capacitor 54, to the electronic gate or mixer 18.

The latter may consist of a pentode-vacuum tube 55, plate and screen voltage to which is supplied through a resistance network 56. The suppressor grid of said tube is conventionally tied to the cathode thereof, and said cathode is grounded. The tube 55 is normally biased beyond cutoff by reason of its control grid being connected to the biasing potentiometer 41.

The output of the gate 18 is applied through a coupling capacitor 57 and a volume control 58 to the power amplifier 20. The latter may consist of a tetrode-vacuum tube 59 the cathode of which is grounded through a biasing resistor 60, shunted by a capacitor 61, the screen grid being directly connected to the "B" supply, and the plate being connected to said "B" supply through the primary of an output transformer 62. The secondary of said output transformer feeds an aural indicator, such as the loud speaker 63.

This completes the description of the aforesaid preferred embodiment of the present invention, and the operation thereof may be briefly summarized as follows:

Inasmuch as the gate 18 is maintained normally inoperative by reason of the value of the bias applied thereto, the audio oscillations generated by the generator 19 do not reach the loud speaker 63. However, upon the production of a beat note in the receiver 10, brought about by mixing a portion of the originally transmitted energy and the reflected or reradiated energy coming from the object entering the "fence," the gate 18 becomes unblocked in synchronism with each positive-going half-cycle of the square-wave voltage derived from said beat note. This permits the audio-frequency oscillations generated by the generator 19, and amplified by the amplifier 49, to pass through the gate, and become further amplified in the amplifier 20 to operate the loud speaker 63. The signal heard in the loud speaker is an interrupted tone frequency signal from the audio frequency oscillator 19, the rate of interruption being equal to the frequency of the beat signal.

This completes the description of the operation of the present invention. It will be noted that inasmuch as it is unnecessary to observe the indicator, the operator of a system employing such an indicator need not divide his attention between the indicator and any other duties which he may have to perform. It will be further noted that the indicator of the present invention is simple in construction, easy and economical to manufacture and assemble, and admirably adapted to perform its intended functions.

Other objects and advantages of the present invention will readily occur to those skilled in the art to which the same relates.

I claim:

1. In combination with a system for detecting moving objects wherein a continuous wave of fixed frequency is directly radiated from a transmitter toward a receiver substantially spaced therefrom and wherein the waves directly received from said transmitter are mixed with waves reflected from a moving object to derive a resultant difference-frequency wave; means for informing the observer of the presence of said object comprising an aural indicator, an audio-frequency oscillator, and gating means under the control of said resultant wave for applying the output of said oscillator to said indicator.

2. The combination set forth in claim 1, wherein said gating means includes an electron tube.

3. The combination set forth in claim 1, wherein said gating means includes a normally blocked electron tube and means controlled by said resultant wave to unblock said tube during a portion of each cycle of said resultant wave.

4. The combination set forth in claim 1, wherein said gating means is a normally blocked electron tube and means controlled by said resultant wave to render said tube conducting during alternate half cycles of said resultant wave.

5. In combination with a system for detecting moving objects wherein a continuous wave of fixed frequency is radiated toward an object and echoes thereof received and wherein said echoes are mixed with a reference wave of fixed frequency to derive a resultant difference-frequency wave; means for informing an observer of the presence of said object comprising an aural indicator, an audio-frequency oscillator, and gating means under the control of said resultant wave for applying the output of said oscillator to said indicator.

6. The combination set forth in claim 5, wherein said gating means includes an electron tube.

7. The combination set forth in claim 5, wherein said gating means includes a normally blocked electron tube and means controlled by said resultant wave to unblock said tube during a portion of each cycle of said resultant wave.

8. The combination set forth in claim 5, wherein said gating means is a normally blocked electron tube and means controlled by said resultant wave to render said tube conducting during alternate half cycles of said resultant wave.

9. The combination set forth in claim 5, wherein said gating means includes means for changing said resultant wave to a square wave, a normally blocked electron tube and means controlled by said square wave to unblock said tube during a portion of each cycle of said square wave.

WILLIAM TUCKER.

REFERENCES CITED

The following references are of record in the file of this patent:

UNITED STATES PATENTS

| Number | Name | Date |
|---|---|---|
| 1,495,616 | Simpson | May 27, 1924 |
| 1,844,950 | Finch | Feb. 16, 1932 |
| 1,981,884 | Taylor | Nov. 27, 1934 |
| 2,011,392 | Bentley | Aug. 13, 1935 |
| 2,086,742 | Scharlau | July 13, 1937 |
| 2,206,903 | Lane | July 9, 1940 |
| 2,272,070 | Reeves | Feb. 3, 1942 |
| 2,379,721 | Koch | July 3, 1945 |
| 2,393,717 | Speaker | Jan. 29, 1946 |